(12) United States Patent
Lee

(10) Patent No.: US 7,943,198 B2
(45) Date of Patent: May 17, 2011

(54) APPARATUS AND METHOD FOR FORMING SEAL PATTERN OF FLAT PANEL DISPLAY DEVICE

(75) Inventor: Hong Seok Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1007 days.

(21) Appl. No.: 11/455,755

(22) Filed: Jun. 20, 2006

(65) Prior Publication Data

US 2007/0154640 A1    Jul. 5, 2007

(30) Foreign Application Priority Data

Dec. 29, 2005 (KR) .................. 10-2005-0133114

(51) Int. Cl.
*B05D 1/32* (2006.01)
(52) U.S. Cl. .................. 427/282; 427/58; 349/190
(58) Field of Classification Search .................. 427/282, 427/58; 349/190
See application file for complete search history.

(56) References Cited

U.S. PATENT DOCUMENTS

| | | | | |
|---|---|---|---|---|
| 5,588,359 A | * | 12/1996 | Hofmann et al. | 101/128.21 |
| 2004/0105065 A1 | * | 6/2004 | Jung et al. | 349/153 |
| 2005/0126679 A1 | * | 6/2005 | Kim | 156/64 |

FOREIGN PATENT DOCUMENTS

| | | |
|---|---|---|
| JP | 2002072222 A * | 3/2002 |
| KR | 10-2004-0046794 | 6/2004 |
| KR | 10-2004-0055271 | 6/2004 |

OTHER PUBLICATIONS

IBM NN 7007397. Jul. 1, 1970.*

* cited by examiner

*Primary Examiner* — Roberts Culbert
(74) *Attorney, Agent, or Firm* — McKenna Long & Aldridge, LLP.

(57) ABSTRACT

Disclosed herein is an apparatus and method for forming a seal pattern of a flat panel display device. An apparatus for forming a seal pattern of a flat panel display panel includes a mother substrate having a plurality of unit display panels formed thereon; a stage to support the mother substrate; a mask on the mother substrate, the mask having openings, each opening being formed on a region corresponding to an outer periphery of each unit display panel; and a pattern forming unit including a seal head to apply a sealant to the mask to form the seal pattern around the outer periphery of each unit display panel of the mother substrate.

11 Claims, 6 Drawing Sheets

APPARATUS AND METHOD FOR FORMING SEAL PATTERN OF FLAT PANEL DISPLAY DEVICE

This application claims the benefit of Korean Patent Application No. P05-133114, filed on Dec. 29, 2005, which is hereby incorporated by reference as if fully set forth herein.

BACKGROUND OF THE INVENTION

1. Field of the Invention

The present invention relates to an apparatus and method for forming a seal pattern of a flat panel display device, and more particularly, to an apparatus and method for forming a seal pattern of a flat panel display device that can improve productivity.

2. Discussion of the Related Art

Advances in information technology result in an increase in performance requirements for display devices in various shapes. Correspondingly, various flat panel display devices, such as liquid crystal display (LCD) devices, plasma display panels (PDPs), electro luminescent display (ELD) devices, vacuum fluorescent display (VFD) devices, and the like, have been recently researched, and some of them have already been applied to various apparatuses in practice.

Among these flat panel display devices, LCD devices are most widely used for a mobile image display device in place of CRT monitors due to their advantages including excellent image quality, lightweight, compactness and low power consumption. Specifically, LCD devices have been developed for monitors of TV sets, which can receive and display broadcasting signals, and monitors of desktop computers as well as mobile display devices such as notebook computers.

In this regard, although various technological developments have been accomplished to enable the LCD devices to act as a screen display device in various fields, the LCD devices still have some problems in operation such as the quality of images. In order to apply the LCD devices to various apparatuses as a general screen display device, it is necessary for the LCD devices to realize high quality images such as high definition, high brightness and large size, while maintaining such advantages as decreased weight, compactness and low power consumption.

Such an LCD device generally includes a liquid crystal display panel to display an image and a driving unit to apply a driving signal to the liquid crystal display panel, in which the liquid crystal display panel includes a first substrate, a second substrate, a liquid crystal layer formed between the first and second substrates assembled to each other with a space defined therebetween. The first substrate (TFT array substrate) is formed with a plurality of gate lines arranged at uniform intervals in one direction, a plurality of data lines arranged at uniform intervals in another direction substantially perpendicular to the gate lines, and a plurality of pixel electrodes, each forming a matrix of pixel regions defined by the data lines and the gate lines crossing each other. A thin film transistor is provided in each pixel region as a switching element to transmit a data signal from the data line to the respective pixel electrode in accordance with a gate signal from the gate line.

The second substrate (color filter substrate) is formed with a black matrix layer to shield light from a portion excluding a pixel region, a color filter layer of R, G and B to display color images and a common electrode to form a predetermined electric field in conjunction with the pixel electrode. In an in-plane switching mode LCD device, the common electrode is formed on the first substrate.

The first and second substrates are assembled by means of a seal pattern with the liquid crystal layer disposed in the space therebetween. Methods for forming a liquid crystal layer between the first and second substrates are divided into an injection method and a dropping method.

For the injection method, an injection hole formed on the liquid crystal display panel with the seal pattern is first immersed into a container filled with liquid crystal within a chamber set to a predetermined vacuum level. Then, the vacuum level of the chamber is changed so that the liquid crystal is injected into a space of the assembled panel through the injection hole due to a pressure difference between an interior of the liquid crystal display panel and an outside thereof. To complete forming a liquid crystal layer of the liquid crystal display panel, the injection hole is then sealed.

For the dropping method, after a seal pattern is formed around an outer periphery of an image display unit of one of the first and second substrates, liquid crystal is dropped to and dispersed on the substrate having the seal pattern formed thereon. Then, a pressure is applied between the first and second substrates to integrate the first and second substrates with the seal pattern and uniformly distribute the liquid crystal on the overall surface of the image display unit, thereby forming a liquid crystal layer of the liquid crystal display panel.

Generally, in the manufacturing of the liquid crystal display panel as described above, a plurality of liquid crystal display panels are simultaneously formed on a large-size mother substrate in order to improve productivity. Accordingly, it is necessary to separate each liquid crystal display panel from the large-size mother substrate by cutting and machining the mother substrate.

FIG. 1 is a schematic view illustrating an apparatus for forming a seal pattern on a substrate according to the related art.

Referring to FIG. 1, the apparatus for forming the seal pattern includes a mother substrate 20 having a plurality of unit display panels 10 formed thereon, a stage 30 movable in the forward, backward, right and left directions while supporting the mother substrate 20, and a pattern forming unit 50 to form a seal pattern 40 around an outer periphery of each unit display panel 10 on the mother substrate 20.

The stage 30 supports the mother substrate 20 loaded thereon from the outside, and can be moved in the forward, backward, right and left directions by a driving unit (not shown).

The mother substrate 20 may be one of first and second substrates. The mother substrate 20 is a large-size substrate and has a plurality of unit display panels 10 formed thereon. Each unit display panel 10 becomes a flat panel display device such as an LCD, PDP, ELD or VFD.

The pattern forming unit 50 includes a seal head 70 to form the seal pattern 40 around the outer periphery of each unit display panel 10 of the mother substrate 20 and a controller 60 to control the seal head 70. In response to a control signal from the controller 60, the seal head 70 forms the seal pattern 40 around the outer periphery of each unit display panel 10 in such a way as to apply a sealant to the mother substrate 20. The stage 30 is conveyed by the driving unit (not shown) to allow the seal pattern 40 to be formed around the outer periphery of each unit display panel 10.

A method for forming a seal pattern with the apparatus according to the related art will now be described.

First, the mother substrate 20 having the plurality of unit display panels 10 formed thereon is loaded on the stage 30.

After aligning the stage 30 and the seal head 70, the seal head 70 is controlled by means of the controller 60 to subsequently apply a sealant to an outer periphery of each unit display panel 10 on the mother substrate 20. The stage 30 is moved in the forward, backward, right and left directions such that the sealant is applied to the outer periphery of each unit display panel 10 from the seal head 70.

In the apparatus and method for forming the seal pattern according to the related art, the seal head 70 forms the seal pattern around the outer periphery of each unit display panel 10 formed on the mother substrate 20. However, when the size of the display panels 10 formed on the mother substrate 20 is changed in accordance with changes in design of the display panels 10, the apparatus and method for forming the seal pattern according to the related art may not efficiently cope with change of size, especially in light of the recent trend toward large-size display panels, which in turn requires an increase in size of the mother substrate. In other words, when the locations of the seal patterns formed on the mother substrate 20 are changed, it is necessary to reconstitute the pattern forming unit 50 including the reconstitution of the seal head 70.

Accordingly, the apparatus and method for forming the seal pattern according to the related art is disadvantageous in that it takes a long time to form seal patterns, thereby decreasing productivity.

SUMMARY OF THE INVENTION

Accordingly, the present invention is directed to an apparatus and method for forming a seal pattern that substantially obviates one or more of the problems due to limitations and disadvantages of the related art.

An advantage of the present invention is to provide an apparatus and method for forming a seal pattern that can improve productivity.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for forming a seal pattern of a flat panel display panel includes a mother substrate having a plurality of unit display panels formed thereon; a stage to support the mother substrate; a mask on the mother substrate, the mask having openings, each opening being formed on a region corresponding to an outer periphery of each unit display panel; and a pattern forming unit including a seal head to apply a sealant to the mask to form the seal pattern around the outer periphery of each unit display panel of the mother substrate.

The mask includes a first masking portion having substantially the same size as that of the mother substrate, a second masking portion formed corresponding to a size of each unit display panel, and the openings formed between the first masking portion and the second masking portion.

The mask includes bridges formed in each opening, and the bridges have either straight line shape or mesh shape.

The pattern forming unit further includes a controller to control the seal head and a supporter to support the seal head and the controller.

The seal head includes a body that contains the sealant; a nozzle installed at a lower end of the body that discharges the sealant according to control of the controller; and a slit formed in the nozzle that allows a constant amount of the sealant to be discharged from the nozzle.

The seal head further includes a roller installed in parallel to the nozzle, and a support bar installed at a rear side of the body that supports the roller.

The seal head further includes a rubber plate installed in parallel to the nozzle, and a support bar installed at a rear side of the body that supports the rubber plate.

The seal pattern is formed by conveyance of the stage or the pattern forming unit.

In another aspect of the present invention, a method for forming a seal pattern of a flat panel display device includes preparing a mother substrate having a plurality of unit display panels formed thereon; mounting the mother substrate on a stage; aligning a mask having openings with the mother substrate, each opening being formed on a region corresponding to an outer periphery of each unit display panel; providing the sealant over each opening in the mask through a nozzle; and passing the sealant through the openings by using a roller or a rubber plate to form the seal pattern around the outer periphery of each unit display panel of the mother substrate.

The seal pattern is formed on the mother substrate by a sealant passing through bridges formed in each opening, and the bridges have one of a straight and mesh shape.

The seal pattern forming step includes forming the sealant over each opening in the mask through a nozzle, and passing the sealant through the openings by using a roller installed in parallel to the nozzle to form the seal pattern around the outer periphery of each unit display panel of the mother substrate via the mask.

Alternatively, the seal pattern forming step includes forming the sealant over each opening in the mask through a nozzle, and passing the sealant through the openings by using a rubber plate installed in parallel to the roller to form the seal pattern around the outer periphery of each unit display panel of the mother substrate via the mask.

The seal pattern is formed by conveyance of one of the stage and the nozzle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
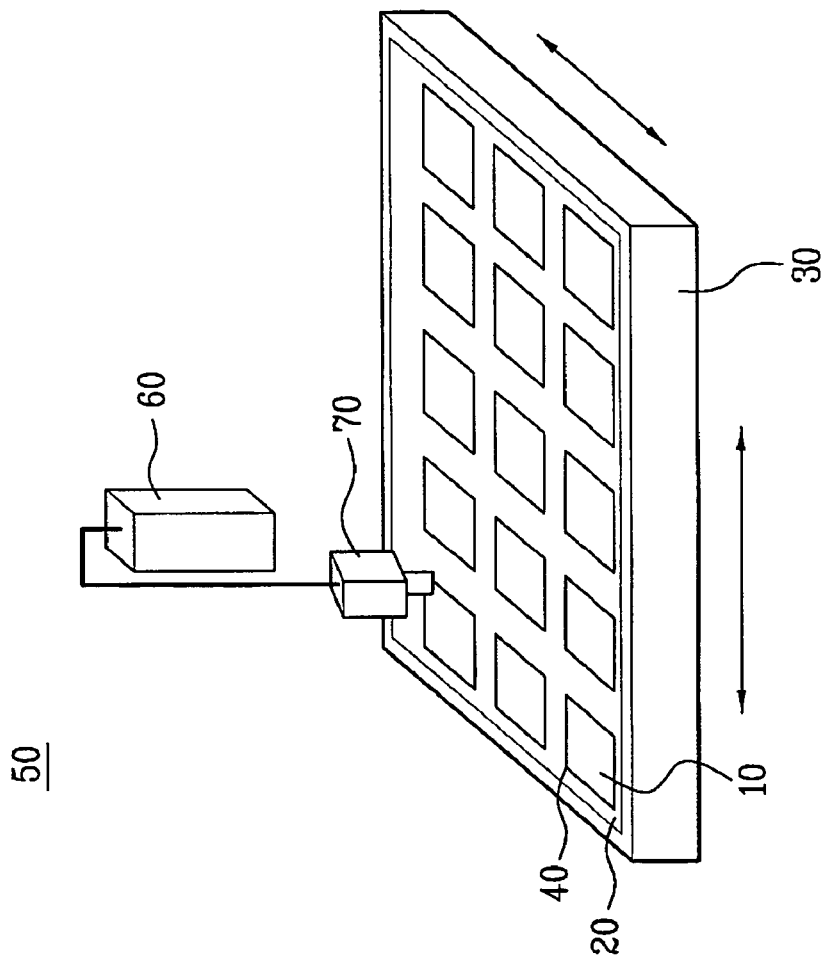
FIG. 1 is a schematic view illustrating an apparatus for forming a seal pattern on a substrate according to the related art.
Figure 2:
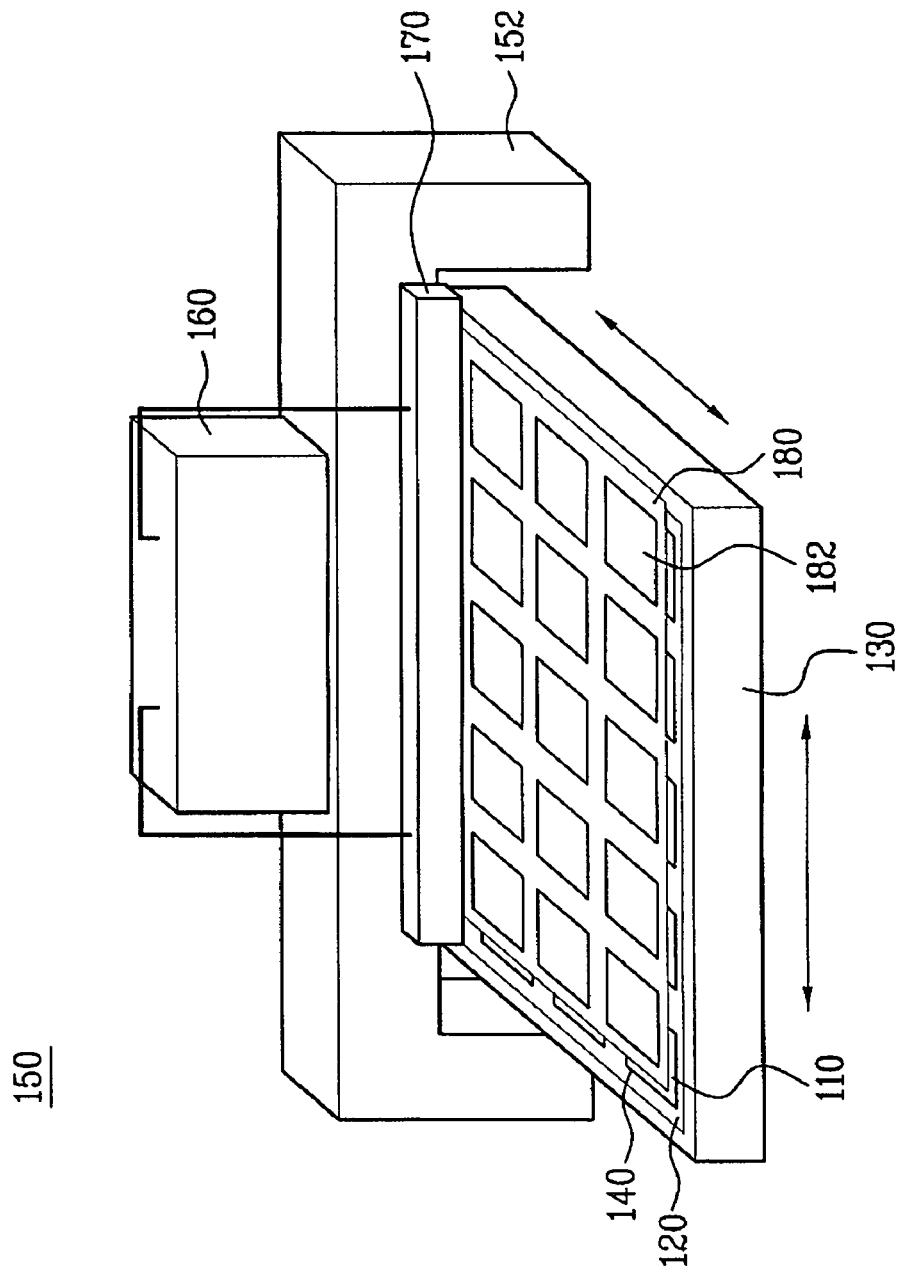
FIG. 2 is a schematic view illustrating an apparatus for forming a seal pattern of a flat panel display device according to an embodiment of the present invention.

FIG. 2 is a schematic view illustrating an apparatus for forming a seal pattern of a flat panel display device according to an embodiment of the present invention.

Referring to FIG. 2, the apparatus for forming the seal pattern includes a mother substrate 120 having a plurality of unit display panels 110 formed thereon, a stage 130 movable in the forward, backward, right and left directions while supporting the mother substrate 120, a mask 180 installed on the mother substrate 120 having openings 182, each having bridges and corresponding to an outer periphery of each unit display panel 110, and a pattern forming unit 150 to form a seal pattern 140 around the outer periphery of each unit display panel 110 of the mother substrate 120 via the mask 180.

The stage 130 supports the mother substrate 120 loaded thereon from the outside, and can be moved in the forward, backward, right and left directions by a driving unit (not shown).

The mother substrate 120 may be one of first and second substrates. The mother substrate 120 may be a large-size substrate and has the plurality of unit display panels 110 formed thereon. Each unit display panel 110 becomes a flat panel display device such as an LCD, PDP, ELD or VFD.

Figure 3A:
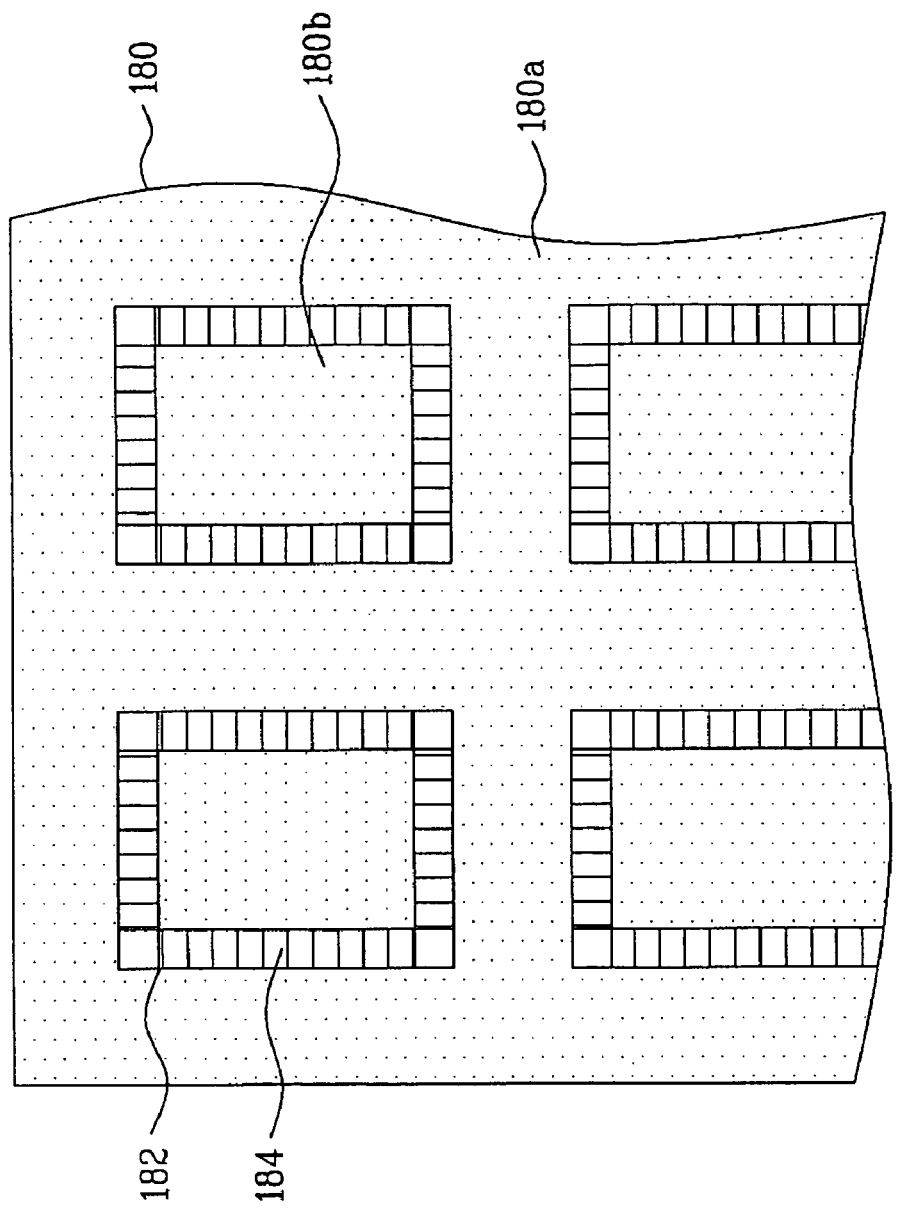
FIGS. 3A and 3B are views illustrating a portion of a mask illustrated in FIG. 2.

As illustrated in FIG. 3A, the mask 180 includes a first masking portion 180a having the same size as that of the mother substrate 120, a second masking portion 180b formed corresponding to a size of each unit display panel 110, and the openings 182 having the bridges 184 and formed between the first masking portion 180a and the second masking portion 180b.

The first masking portion 180a masks the overall mother substrate 120 excluding a region of the second masking portion 180b and a region including the openings 182.

The second masking portion 180b masks a region of the mother substrate 120 corresponding to each unit display panel 110.

Figure 3B:
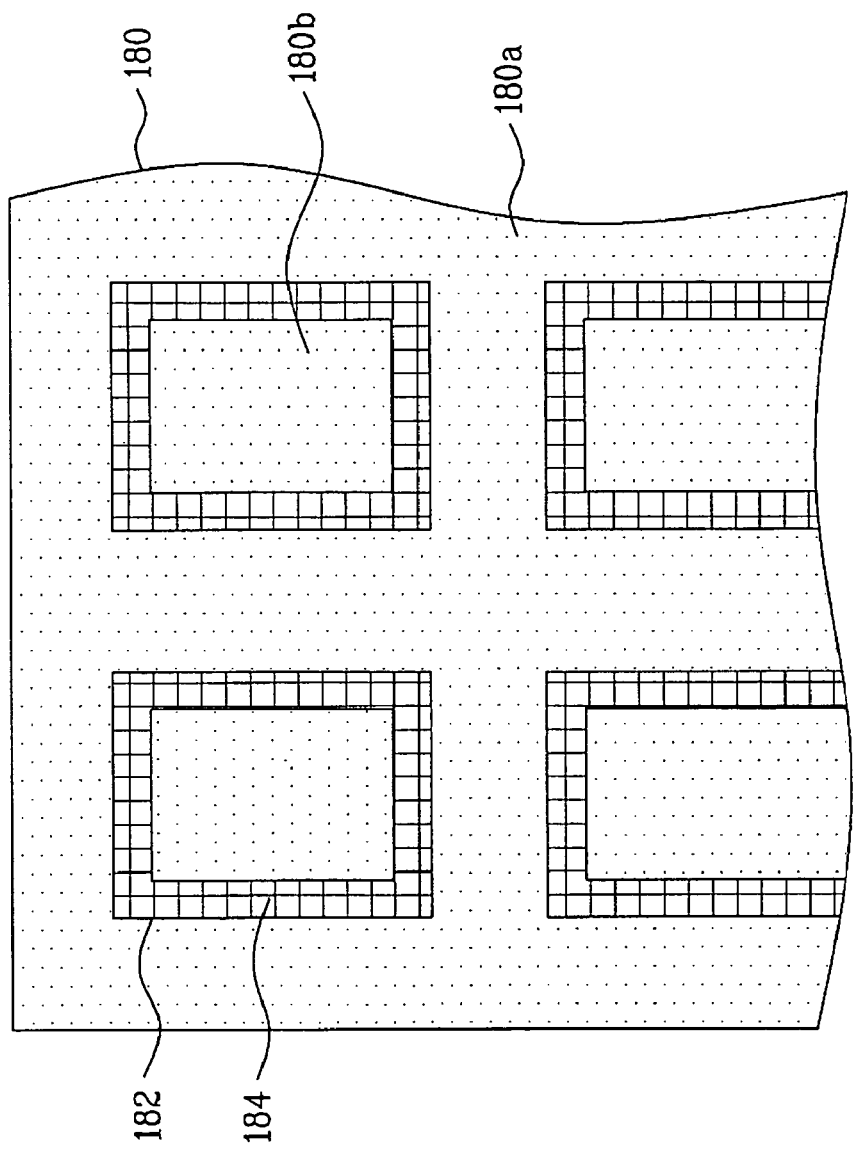

Each opening 182 is formed around the outer periphery of each unit display panel 110, where the seal pattern 140 will be formed. The opening 182 is formed with the bridges 184 that may structurally connect the first masking portion 180a with the second masking portion 180b. The bridges 184 may be formed at constant intervals between the first and second masking portions 180a and 180b and may have a straight line shape, as illustrated in FIG. 3A, or a mesh shape as illustrated in FIG. 3B.

The pattern forming unit 150 includes a seal head 170 with a straight shape to apply a sealant to the mask 180, a controller 160 to control the seal head 170, and a supporter 152 to support the seal head 170 and the controller 160.

The support 152 is installed at one side of the stage 130 and supports the controller 160 and the seal head 170. The support 152 has a central portion opened to allow the stage 130 to move in the forward, backward, right and left directions therein.

Figure 4:
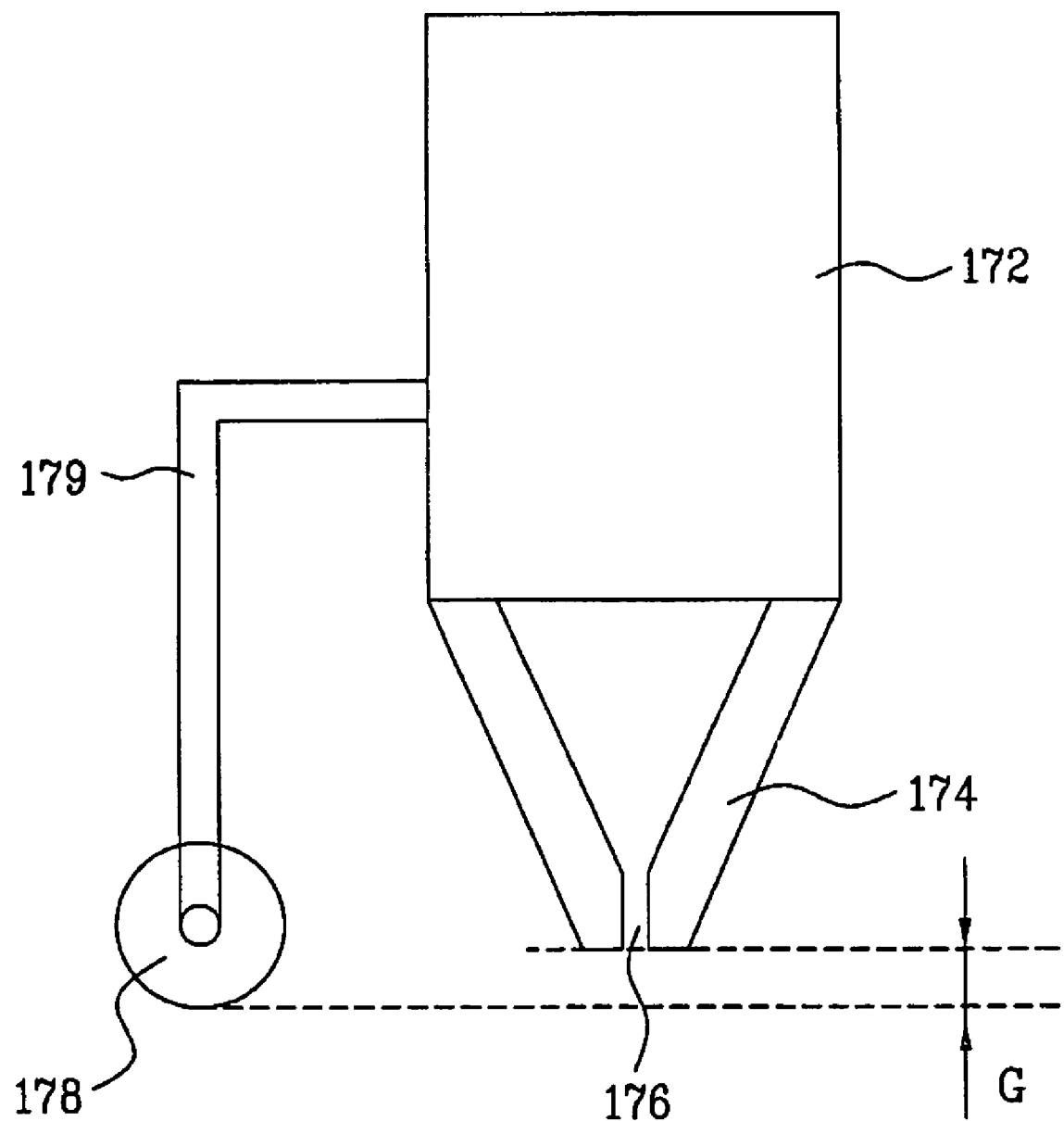
FIG. 4 is a view illustrating a seal head according to a first embodiment of the present invention.

The seal head 170 is installed at a side of the support 152 so as to face the stage 130 and serves to apply the sealant over the whole surface of the mask 180. To this end, the seal head 170 according to a first embodiment of the present invention includes a body 172 in which the sealant is contained, a nozzle 174 installed at a lower end of the body 174, and a slit 176 formed in the nozzle 174, as illustrated in FIG. 4.

The body 172 has an elongated shape in parallel to a side of the mother substrate 120 and contains the sealant therein. The nozzle 174 discharges the sealant contained in the body 172 according to control of the controller 160. The slit 176 adjusts an amount of the sealant discharged through the nozzle 174 to allow a constant amount of the sealant to be applied to the mask 180.

The seal head 170 further includes a roller 178 installed in parallel to the nozzle 174, and a support bar 179 installed at a rear side of the body 172 to support the roller 178.

The roller 178 is installed in parallel to the nozzle 174 at the rear side thereof with the support bar 179 such that the sealant applied to the mask 180 is transferred onto the mother substrate 120 in a pattern via the openings 182 of the mask 180 upon movement of the stage 130. That is, the roller 178 serves to help efficient entrance of the sealant applied to the mask 180 through the openings 182. To this end, the roller 178 is beneficially installed at a predetermined height G lower than the nozzle 174 with reference to the surface of the mask 180. Such a roller 178 may be required in a case where the sealant does not efficiently pass through the openings 182 due to a high viscosity thereof. Thus, the roller 178 may not be required in a case where the sealant efficiently enters the openings 182 due to its low viscosity.

Figure 5:
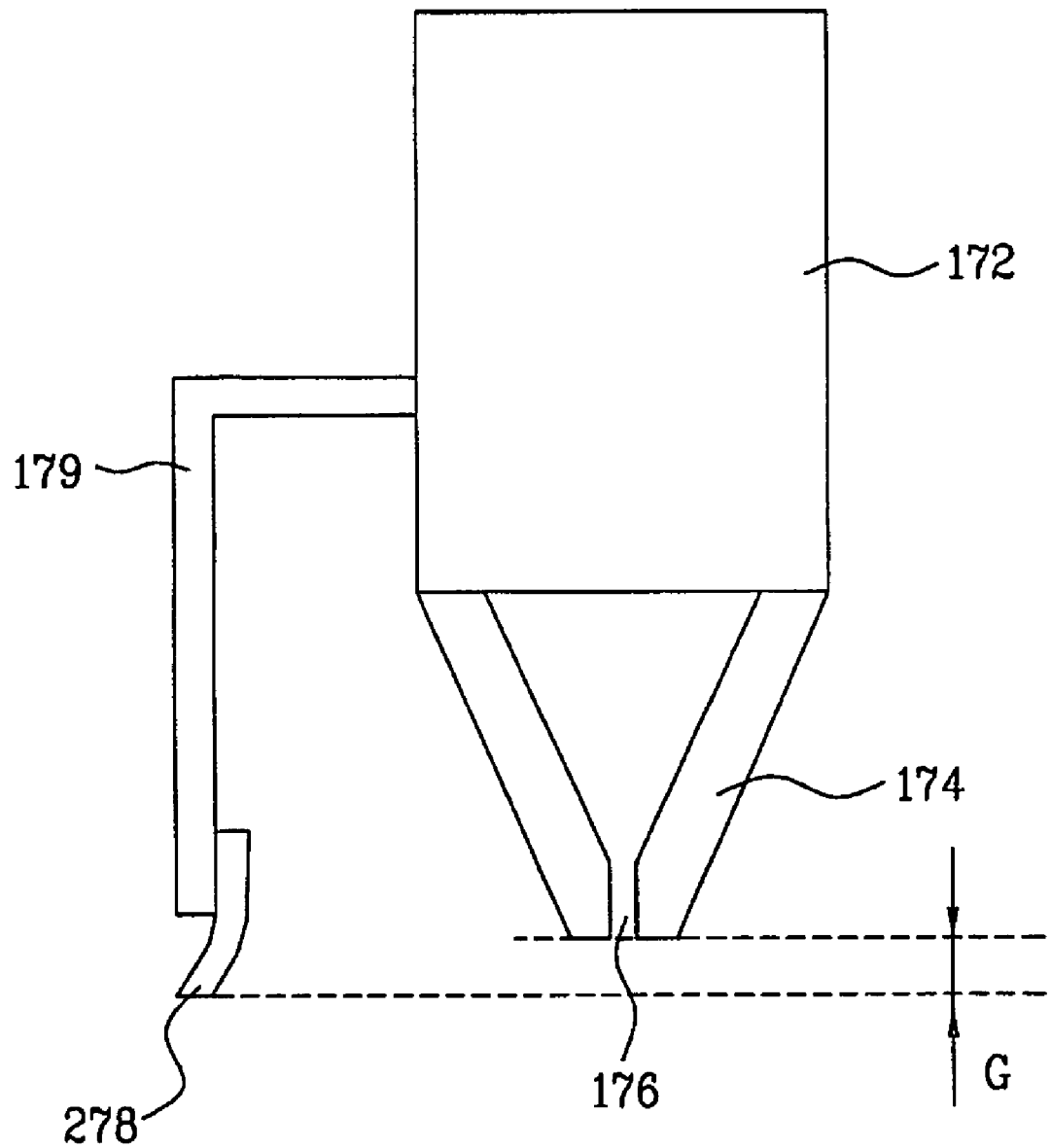
FIG. 5 is a view illustrating a seal head according to a second embodiment of the present invention.

The seal head 170 according to a second embodiment of the present invention includes a body 172 in which the sealant is contained, a nozzle 174 installed at a lower end of the body 174, a slit 176 formed in the nozzle 174, a rubber plate 278 installed in parallel to the nozzle 174, and a support bar 179 installed at the rear side of the body 172 to support the rubber plate 278, as illustrated in FIG. 5.

The seal head 170 according to the second embodiment has the same construction as that of the first embodiment except for the rubber plate 278.

The rubber plate 278 is installed in parallel to the nozzle 174 at the rear side thereof with the support bar 179 such that the sealant applied to the mask 180 is transferred onto the mother substrate 120 in a pattern via the openings 182 of the mask 180 upon movement of the stage 130. That is, the rubber plate 278 serves to help efficient entrance of the sealant applied to the mask 180 to the openings 182. To this end, the rubber plate 278 is beneficially installed at a predetermined height G lower than the nozzle 174 with reference to the surface of the mask 180. Such a rubber plate 278 may be required in a case where the sealant does not efficiently pass through the openings 182 due to a high viscosity thereof. Thus, the rubber plate 278 may not be required in a case where the sealant efficiently enters the openings 182 due to its low viscosity.

A method for forming a seal pattern of a flat panel display device with the apparatus in accordance with the embodiments of the present invention will now be described.

First, the mother substrate 120 having the plurality of unit display panels 110 formed thereon is loaded on the stage 130.

The mask 180 having the openings 182 with the bridges 184 is then aligned with the mother substrate 120 mounted on the stage 130. Each opening 182 is aligned to correspond to an outer periphery of each unit display panel 110 formed on the mother substrate 120.

After aligning the stage 130 and the seal head 170, a sealant is applied to the overall surface of the mask 180 via the nozzle 172 of the seal head 170. The sealant discharged through the nozzle 172 is applied in a uniform amount to the mask 180 by the slit 176 formed in the nozzle 174.

The stage 30 is then moved in the forward, backward, right and left directions. Accordingly, the sealant applied to the mask 180 is applied to the outer periphery of each unit display panel 110 of the mother substrate 120 via the openings 182 of the mask 180 by means of the roller 178 or the rubber plate 278 installed at the seal head 170. Because of a predetermined viscosity of the sealant, the seal pattern can be properly formed on the mother substrate 120 in the presence of the bridges 184 in each opening 182.

The seal pattern is then formed around the outer periphery of the unit display panels 110 on the mother substrate 120. After moving the mask 180 disposed on the mother substrate 120, the mother substrate 120 mounted on the stage 130 is transferred to an assembling apparatus.

According to the present invention, the pattern forming unit 150 including the seal head 170 may be moved to form the seal pattern around the outer periphery of each unit display panel 110 of the mother substrate 120 instead of moving the stage 130.

In such an apparatus and method for forming the seal pattern of the flat panel display device according to the present invention, the mask 180 having the openings 182 corresponding to the seal pattern is disposed on the mother substrate 120, and then the sealant is applied to the overall surface of the mask 180 to form the seal pattern corresponding to the openings 182 around the outer periphery of each unit display panel 110 of the mother substrate 120.

As apparent from the above description, the apparatus and method for forming the seal pattern according to the present invention can reduce the time required to form the seal pattern on the mother substrate, thereby reducing the overall tack time and enhancing productivity. In particular, the apparatus and method for forming the seal pattern according to the present invention can maintain a predetermined tack time regardless of a design of the display panel by allowing the seal pattern to be formed according to the shape of the openings.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for forming a seal pattern of a flat panel display device, comprising:
   preparing a mother substrate having a plurality of unit display panels formed thereon;
   mounting the mother substrate on a stage;
   aligning a mask having openings with the mother substrate, each opening being formed on a region corresponding to an outer periphery of each unit display panel;
   providing the sealant over a whole surface of the mask including openings through a nozzle by moving the stage; and
   passing the sealant through the openings by using a roller or a rubber plate and by moving the stage to form the seal pattern around the outer periphery of each unit display panel of the mother substrate,
   wherein the nozzle has a straight shape so as to apply the sealant over the whole surface of the mask, and the roller or the rubber plate is supported by a support bar installed at the nozzle.

2. The method as set forth in claim 1, wherein the seal pattern is formed on the mother substrate by a sealant passing around bridges formed in each opening.

3. The method as set forth in claim 2, wherein the bridges have one of a straight shape and mesh shape.

4. The method as set forth in claim 1, wherein the roller is installed in parallel to the nozzle.

5. The method as set forth in claim 1, wherein the seal pattern is formed by conveyance of one of the stage and the nozzle.

6. The method as set forth in claim 1, wherein the rubber plate is installed in parallel to the nozzle.

7. The method as set forth in claim 1, wherein the mask further includes a first masking portion having substantially the same size as that of the mother substrate and a second masking portion formed corresponding to a size of each unit display panel.

8. The method as set forth in claim 1, wherein the sealant is contained in a body of a seal head and the nozzle is installed at a lower end of the body.

9. The method as set forth in claim 8, wherein the nozzle has a slit to allow a constant amount of the sealant to be discharged from the nozzle.

10. The method as set forth in claim 8, wherein the roller or the rubber plate is supported by the support bar installed at a rear side of the body.

11. The method as set forth in claim 1, wherein the flat panel display device is one of a liquid crystal display device, plasma display panel, electro luminescent display device and vacuum fluorescent display device.

* * * * *